March 23, 1965 R. K. LEE, JR., ETAL 3,175,196

THERMOPLASTIC INFORMATION STORAGE SYSTEM

Filed March 9, 1962 2 Sheets-Sheet 1

INVENTORS
ROGER K. LEE JR.
DARIUS VAKHARIA

BY Philip J. McFarland
ATTORNEY

THERMOPLASTIC INFORMATION STORAGE SYSTEM

Filed March 9, 1962 2 Sheets-Sheet 2

INVENTORS
ROGER K. LEE JR.
DARIUS VAKHARIA
BY
Philip J McFarland
ATTORNEY

United States Patent Office 3,175,196

Patented Mar. 23, 1965

3,175,196
THERMOPLASTIC INFORMATION STORAGE SYSTEM

Roger K. Lee, Jr., Watertown, and Darius Vakharia, Cambridge, Mass., assignors to Laboratory for Electronics, Inc., Boston, Mass., a corporation of Delaware

Filed Mar. 9, 1962, Ser. No. 178,689
6 Claims. (Cl. 340—173)

Figure 1:
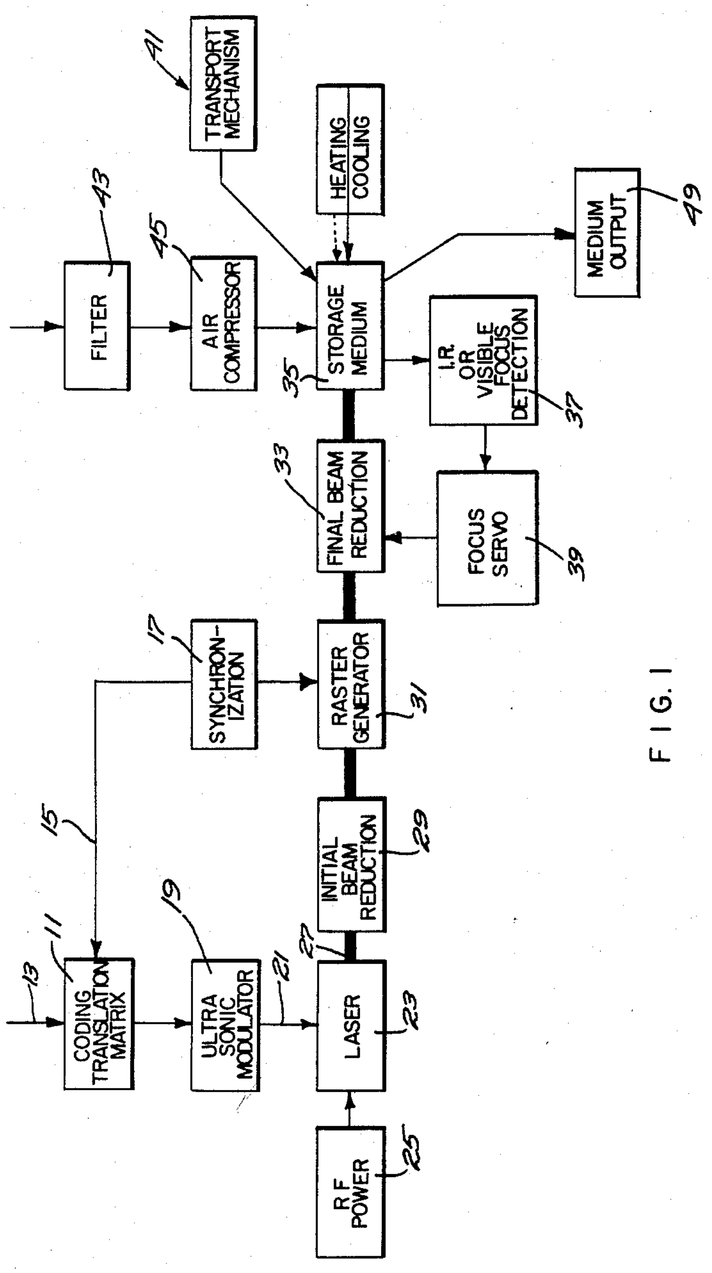

This invention pertains generally to data processing apparatus and particularly to apparatus in which electric signals may be stored in a reusable storage medium and such stored signals may be optically read out.

Conversion apparatus to translate the electric signal output of high speed data processing equipment to a readable form is an essential part of present day data processing systems. Satisfactory conversion apparatus, among other things, must be adapted to the storage of large amounts of information in a reasonable space, must be fast and dependable in operation, and must be usable in different environments. Further, it is highly desirable that the storage medium be reusable if desired to minimize supply problems in a high volume data processing system. It is evident, therefore, that satisfactory conversion apparatus is difficult to design and construct.

Many different physical phenomena have been utilized for data conversion apparatus. For example, magnetic storage, cathode ray writing and photographic techniques applicable to data conversion are well known in the art. There remains, however, a great need in the field for conversion apparatus which more nearly meets the diverse requirements set forth above.

Therefore, it is an object of this invention to provide improved conversion apparatus for high speed data processing equipment, such conversion apparatus combining the advantages of high resolution and speed of operation with an adaptability to use in different environments.

Another object of this invention is to provide improved conversion apparatus for high speed data processing equipment, such conversion apparatus producing a visible record of the data being processed.

Still another object of this invention is to provide improved conversion apparatus for data processing equipment, such conversion apparatus utilizing a reusable recording medium.

These and other objects of the invention are attained generally by providing a thermoplastic recording medium, means for moving such medium past a recording station and subjecting successive portions of such medium to the heating action of a beam of infra-red energy (such beam being intensity-modulated in accordance with the data being processed) to melt successive portions with such medium in accordance with the instantaneous intensity of the beam, means for then subjecting the so-treated medium to a fluid jet, as air, to deform the melted portions and cool the medium to normal ambient temperatures so that a surface of the thermoplastic recording medium is deformed in accordance with the variations in the beam of infra-red energy, and subsequently observing such deformations, using optical techniques, to retrieve the so-recorded information. In addition, whenever desired, a used thermoplastic recording medium may be rendered fit for reuse simply by heating in any known heating apparatus and, if desired, running the heated medium through a calender.

Figure 2:
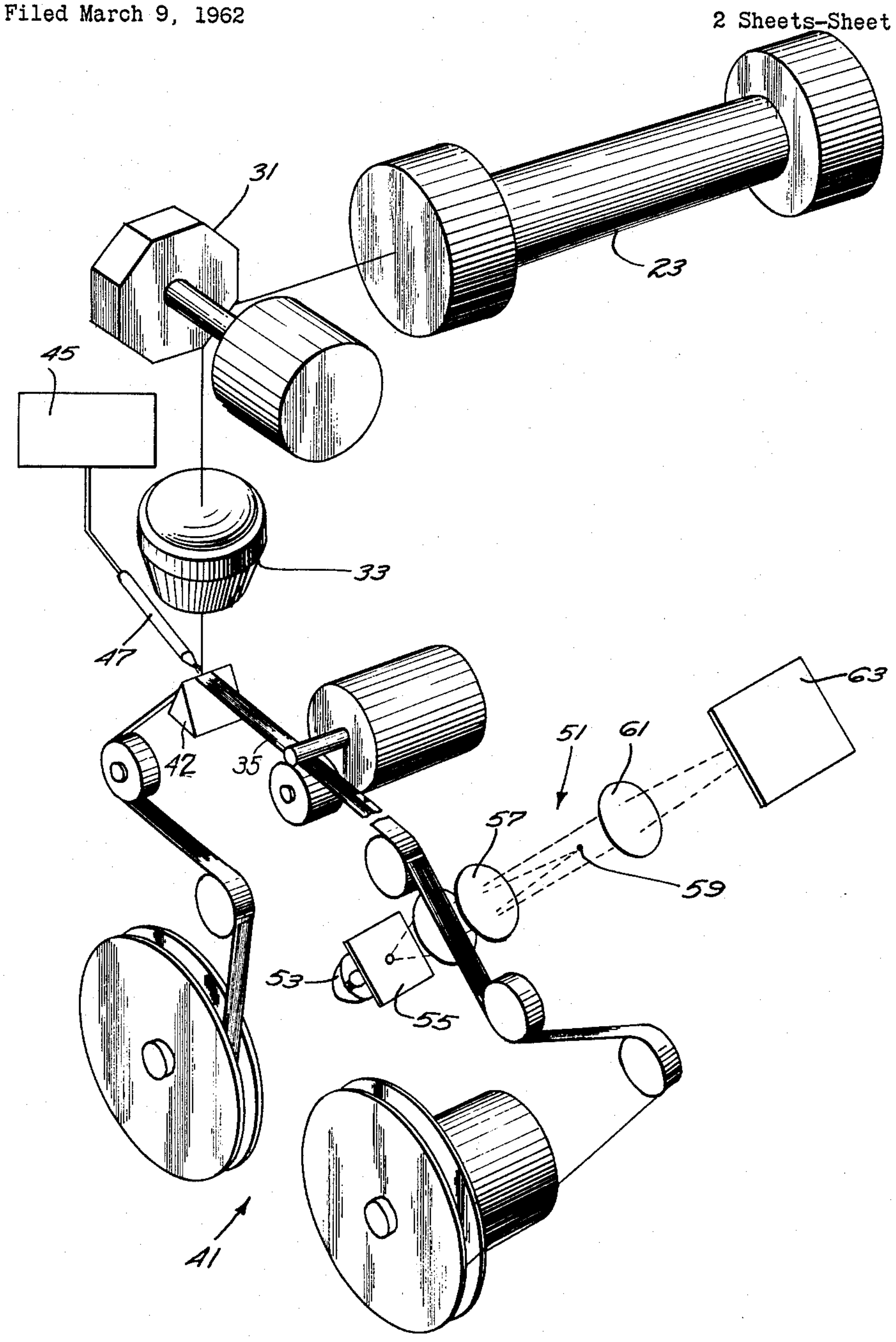

For a more complete understanding of the invention reference is now made to the detailed description of a preferred embodiment of the invention illustrated in the accompanying drawings, in which:

FIG. 1 is a block diagram of a complete recording system showing particularly a preferred method of recording as contemplated by the invention; and, FIG. 2 is a simplified perspective view of apparatus according to a preferred embodiment of the invention adapted to carry out the functions of storing data by deforming a record medium in accordance with such data and reading out the stored data by optically scanning the deformed recording medium.

Referring now to the figures it may be seen that an input electric signal to be processed (which signal may be produced in any known way and be either analog or digital in nature) is fed into a coding translation matrix 11 wherein such signal may be stored temporarily. The coding translation matrix 11 may be any known buffer storage device, as an ultrasonic delay line or a magnetic register, which is triggered by a synchronizing pulse from a synchronization source 17. The output of the coding translation matrix 11 is, upon triggering by the synchronization pulse, led to an ultrasonic modulator 19 to produce a modulation signal for a laser 23. A source of radio frequency power 25 is used to pump the laser 23. The ultrasonic modulator 19, the laser 23 and the source of radio frequency power 25 may be of the type described in detail in the application Serial No. 178,021 of Roger K. Lee filed on the same date as this application and assigned to the same assignee as this application. Briefly, however, the laser 23 preferably is a gaseous laser of the helium-neon type and the ultrasonic modulator 19 is a piezo-electric crystal bearing on one of the reflectors of the laser 23 so as to vary the optical flatness of the reflector in accordance with the signal out of the coding translation matrix 11. The source of radio frequency power 25 is an oscillator the output of which is applied, as through electrodes (not shown), to the laser 23 to excite that element so that it is rendered capable of stimulated coherent radiation. Consequently, a beam 27 of radiation in the infra-red portion of the spectrum, intensity-modulated by the ultrasonic modulator 19 is produced by the laser 23. The beam 27 emanating from the laser 23 is passed through an initial beam reduction element 29, as a lens, to a raster generator 31, as a rotating polygonal mirror, and thence through a final beam reduction element 33, as a variable focus lens, to a storage medium 35. As illustrated, the storage medium 35 is a laminated tape consisting of a base fabricated from a stable polyester and a layer of a low viscosity, low melting point plastic, as polystyrene, on such a base. An automatic focussing assembly comprising an infra-red detecting device 37, as a photocell, controlling a servo drive unit 39 controls the final beam reduction element 33 to hold constant the cross-sectional area of the beam 27 on the storage medium 35. The storage medium 35 is moved by means of a transport mechanism 41, as shown in detail in FIG. 2, at a substantially constant speed over a knife-edge 42. An air jet, formed by passing air through a filter 43, an air compressor 45 and a nozzle 47 (shown in FIG. 2), is directed on to the storage medium 35 just downstream of the line traced thereon by the beam 27. Thus, the beam 27 which is intensity-modulated and swept across the width of the storage medium 35 by the raster generator 31 melts areas of the polystyrene layer in accordance with the data being processed. While the polystyrene layer is still in a molten state it is subjected to the action of the air jet from the nozzle 47. Since surface tension of the molten areas is relatively low, the force of the air jet causes such areas to be deformed into the shape of small craters leaving the remaining areas untouched. At the same time, the air jet quickly cools the molten areas of the storage medium 35 to freeze the craters in place. As a result, then, the storage medium 35 bears the recorded data in the form of small depressions, or craters. It is now noted that essentially the same effect may be obtained by merely bending the storage medium 35 over knife-edge 42.

When it is desired to read the data stored in the storage medium 35 the transport mechanism 41 is energized so as to move the storage medium 35 past a viewing station designated in FIG. 1 by the block 49 marked "medium output" and in FIG. 2 by a Schlieren lens system 51. As shown clearly in the latter figure, light from a lamp 53 is directed through an aperture plate 55, the storage medium 35 and a field lens 57, either to impinge on a stop 59 or pass through a projection lens 61 to a viewing screen 63. It should be noted here that the viewing screen 63 may be replaced directly with a photocell. If there are craters in the storage medium 35, the curved sides of such craters cause the light passing through the storage medium 35 to be refracted and pass the stop 59 through the projection lens 61 to the viewing screen 63. If there are no craters, the light is not refracted upon passing through the storage medium 35 and, consequently, is focussed by the field lens 57 on the stop 59. The gradations in light falling on the viewing screen 63 are, as a result, indicative of the data stored in the storage medium 35.

After the information is read out of the recording medium 35, the surface of the storage medium 35 may be restored to its original condition by subjecting the entire storage medium 35 to a heating/cooling cycle, as in an oven designated by block 65 of FIG. 1. Obviously, calender rolls may also be used in conjunction with such a heating/cooling cycle.

It will be immediately apparent to those skilled in the art that modifications to and changes in the preferred embodiment of the invention may be made without departing from the concept of the invention. For example, although it is preferred to use an internally modulated laser, other heat sources which may be internally or externally modulated may be substituted for the preferred laser. Other exemplary changes are equally obvious, as eliminating the scanning mirror and reorienting the storage medium so that scanning of the storage medium is not required, thus obviating the necessity of providing a coding translation matrix. It is, therefore, felt that the invention should not be restricted to its preferred embodiment as illustrated and described, but rather should be limited only by the spirit and scope of the appended claims.

What is claimed is:

1. Data processing apparatus comprising:
(*a*) means for generating a beam of electromagnetic energy, the wavelength of such energy being within the infra-red portion of the electromagnetic spectrum;
(*b*) means for modulating the intensity of the electromagnetic energy in the beam in accordance with the data being processed;
(*c*) a thermoplastic recording medium;
(*d*) means for moving the thermoplastic recording medium relative to the beam to heat successive areas of such medium in accordance with the intensity of the electromagnetic energy in the beam; and,
(*e*) means for directing a fluid stream at the so-heated successive areas of the thermoplastic recording medium to deform the surface thereof in accordance with the amount of heat absorbed therein and to cool such successive areas to substantially the same temperature as the unheated portions of the thermoplastic recording medium.

2. Data processing apparatus as in claim 1 having additionally:
(*a*) means for moving the deformed thermoplastic recording medium through an optical projection lens system; and,
(*b*) means for detecting variations in the intensity of light passing through the deformed thermoplastic recording medium.

3. Data processing apparatus as in claim 2 wherein the last-named means includes a photocell to produce an electric signal corresponding to the data being processed.

4. Data processing apparatus as in claim 2 wherein the last-named means includes a viewing screen to produce a visible image of the data being processed.

5. Data processing apparatus comprising:
(*a*) a laser producing a beam of substantially coherent and monochromatic electromagnetic energy, the wavelength of such energy being within the infra-red portion of the electromagnetic spectrum;
(*b*) means for modulating the intensity of the electromagnetic energy in the beam in accordance with the data being processed;
(*c*) a thermoplastic recording medium;
(*d*) means for moving the thermoplastic recording medium relative to the so-modulated beam to heat successive areas of such medium in accordance with the intensity of the so-modulated beam; and
(*e*) means for directing a fluid stream at the so-heated thermoplastic recording medium simultaneously to deform the heated areas thereof and to cool such areas.

6. Data processing apparatus as in claim 5 wherein:
(*a*) the thermoplastic recording medium comprises a flexible tape;
(*b*) the means for moving the thermoplastic recording medium relative to the beam of electromagnetic energy includes transport means for moving the tape perpendicularly to the beam and a rotating mirror in the path of the beam to sweep the beam across the width of the flexible tape; and,
(*c*) the means for directing a fluid stream at the thermoplastic recording medium includes a nozzle and means for forcing air therethrough.

References Cited in the file of this patent

UNITED STATES PATENTS 2,630,484 Groak ---------------- Mar. 3, 1953
2,927,959 Mast ----------------- Mar. 8, 1960